United States Patent
Zheng et al.

(10) Patent No.: US 6,236,714 B1
(45) Date of Patent: May 22, 2001

(54) TRANSMIT POWER CONTROL FOR DSL MODEMS IN SPLITTERLESS ENVIRONMENT

(75) Inventors: Qingyi Zheng; Guozhu Long, both of Newark, CA (US)

(73) Assignee: Centillium Communications, Inc., Fremont, CA (US)

(*) Notice: Subject to any disclaimer, the term of this patent is extended or adjusted under 35 U.S.C. 154(b) by 0 days.

(21) Appl. No.: 09/346,781

(22) Filed: Jul. 7, 1999

(51) Int. Cl.$^7$ .................................................. H04M 1/24
(52) U.S. Cl. .................................. 379/6; 379/27; 379/28; 379/30
(58) Field of Search .................................. 379/1, 24, 27, 379/28, 29, 32, 93.36, 322, 323, 324, 413, 6, 30; 375/227, 228; 455/13.4

(56) References Cited

U.S. PATENT DOCUMENTS

| | | | |
|---|---|---|---|
| 4,630,228 | 12/1986 | Tarczy-Hornoch et al. | 364/576 |
| 5,764,694 | 6/1998 | Rahamim et al. | 375/224 |
| 5,805,669 | * 9/1998 | Bingel et al. | 379/28 |
| 6,014,425 | * 1/2000 | Bingel et al. | 379/27 |
| 6,061,427 | * 5/2000 | Ryoo | 379/1 |
| 6,101,216 | * 8/2000 | Henderson et al. | 375/222 |
| 6,141,377 | * 10/2000 | Sharper et al. | 375/222 |
| 6,144,734 | * 11/2000 | Beeman | 379/398 |

FOREIGN PATENT DOCUMENTS

WO 98/59426  12/1998  (WO) ............................. H04B/1/38

OTHER PUBLICATIONS

*Splitterless DMT System Design and Measurements*; Aware, Inc.; ITU; Temporary Doc. RB–019–E; Redbank NJ, Oct. 27–29, 1997.
*Splitterless G. Lite Interoperability With ANSI T1.413 and/or G.DMT*; Aware, Inc.; ITU; Temporary Doc. RB–022–E; Redbank NJ, Oct. 27–29, 1997.

* cited by examiner

*Primary Examiner*—Curtis Kuntz
*Assistant Examiner*—Binh K. Tieu
(74) *Attorney, Agent, or Firm*—Fenwick & West LLP

(57) ABSTRACT

A Digital Subscriber Line (DSL) modem determines the proper transnit power level in a splitterless environment by transmitting a probe signal at different power levels to a telephone set and measuring the distortion signal reflected from the telephone set for each power level. The proper transmit power level is determined by detecting the "comer point" of the reflected distortion signal.

24 Claims, 9 Drawing Sheets

TRANSMIT POWER CONTROL FOR DSL MODEMS IN SPLITTERLESS ENVIRONMENT

FIELD OF THE INVENTION

This invention relates to Digital Subscriber Line (DSL) technology for communicating data over telephone subscriber loops, and more particularly, to reducing voiceband distortion in a splitterless DSL system.

BACKGROUND OF THE INVENTION

DSL technologies provide subscribers with high-speed access to computer networks over existing twisted-pair copper telephone wires. Competing DSL technologies include, for example, High-bit-rate DSL (HDSL), Rate Adaptive DSL (RADSL), and Asymmetric DSL (ADSL). Each of these DSL technologies offers different speeds, ranges, and operating characteristics.

One of the more promising DSL technologies is ADSL. A typical ADSL circuit connects an ADSL modem on each end of a twisted-pair of copper telephone lines. The ADSL modems communicate over three information channels: a high speed downstream channel, a medium speed upstream channel, and a Plain Old Telephone Service (POTS) channel.

In conventional ADSL systems, the POTS channel is split off from the other channels by a splitter installed at the customer's premise. The installation is typically done by technical personnel, and may include the re-wiring of existing telephone lines. This kind of installation can incur significant costs and inconvenience for the customer.

For new DSL systems intended to be deployed in large volumes to the general public, it is desirable to provide for easy installation of the ADSL modem at the customer's premise. One way to simplify installation is to remove the splitter entirely from the system. The ADSL modem can then be plugged directly into an existing telephone jack. This splitterless configuration enables the ADSL modem to share the same wiring as the customer's telephone sets without the need for installing a splitter or rewiring the customer's premise.

The deployment of ADSL systems in a splitterless environment prompted the development of splitterless ADSL modems. One example of a splitterless ADSL modem is defined in International Telecommunication Union Standardization Sector ("ITU-T") recommendation G.992.2 (October 1998), which is incorporated by reference herein in its entirety. With splitterless ADSL modems, the installation of the splitter and/or rewiring is no longer necessary. Without the splitter, high frequency ADSL signals are transmitted directly to the customer's telephone sets. The ADSL signals include downstream signals transmitted from the Central Office (CO) modem and upstream signals transmitted from the Customer Premises Equipment (CPE) modem.

High frequency ADSL signals have a higher transmit power than POTS signals and may be electronically "clipped" by internal telephone set circuitry if such power exceeds a predetermined power threshold designed to protect the user's hearing. This is especially problematic for upstream signals since the CPE modem is typically located close to the telephone set. Thus, the upstream signal level at the telephone set is basically equal to the transmitted signal level, while the downstream signals are attenuated by the telephone lines. This "clipping" effect can introduce non-linear distortion within the POTS frequency band, which can interfere with POTS services (e.g., telephony, voiceband modems, and facsimile machines).

A fast retrain procedure for estimating the proper level of transmit power for ADSL modems in a splitterless environment is described in ITU-T recommendation G.992.2. During this fast retrain procedure, a single R-line-probe signal is transmitted to the telephone sets from the CPE modem to estimate the proper transmit power level. The characteristics (i.e., shape and level) of this R-line-probe signal is vendor-discretional, and thus not defined in G.992.2.

Unfortunately, estimating the proper transmit power is difficult because splitterless environments can include several different types of telephone sets, each connected to the same telephone wiring as the CPE modem. These telephones sets typically have different electrical characteristics, thereby making it difficult for the CPE modem to set the proper transmit power level without prior knowledge of the types of telephone sets being used. Depending on the types of telephone sets used, if the transmit power level is reduced too much, the reduction of the signal-to-noise ratio (SNR) of the ADSL signals may cause significant data rate reduction, or even become inadequate for data communication. On the other hand, if the transmit power is reduced too little, distortion may still be audible to the user.

Accordingly, there is a need for a system and method of controlling the transmit power level of a DSL modem operating in a splitterless environment without regard to the number and type of telephones sets being used. The system and method should minimize audible distortion in the voiceband while providing a signal-to-noise-ratio (SNR) adequate for DSL data communication. Such a system and method should operate on the fly without prior knowledge of the electrical characteristics of the telephone sets being used.

SUMMARY OF THE INVENTION

The present invention determines the proper transmit power level in a splitterless DSL environment having one or more telephone sets by transmitting a probe signal at different power levels to the telephone set and measuring the distortion signal reflected from the telephone set for each power level. The proper transmit power level is determined by detecting the "corner point" of the reflected distortion signal.

A method of reducing distortion in the voiceband of a splitterless DSL comprises the steps of: transmitting a probe signal to at least one telephone set, the probe signal having a first power level; receiving a distortion signal reflected from the telephone set; computing a first measurement of the distortion signal; adjusting the first power level to a second power level; computing a second measurement of the distortion signal; and detecting a comer point in the received distortion signal from the first and second measurements. A third power level associated with the detected comer point is saved for later use in data transmission.

A system for reducing distortion in the voiceband of a splitterless DSL includes a probe signal generator, a distortion level detector, and a comer point detector. The probe signal generator is coupled to a telephone line for transmitting a probe signal to at least one telephone set at a plurality of power levels. The distortion level detector is coupled to the telephone line for receiving and measuring a distortion signal reflected from the telephone set for each one of the plurality of power levels. The corner point detector is coupled to the probe signal generator and the distortion level detector for detecting a corner point in the received distortion signal from the measurements.

In a preferred embodiment, the probe signal is divided into a plurality of sections, wherein each section has a plurality of symbols that are transmitted at a predetermined power level. The power level can also be determined by the corner point detector during retrain to provide coarse adjustments in the power level. The corner point detector computes a ratio having a numerator equal to the difference between the first and second measurements and a denominator equal to the difference between the first and second power levels, and compares the ratio value against a predetermined value.

DETAILED DESCRIPTION OF THE PREFERRED EMBODIMENTS

The following text and figures describe a system and method for controlling the transmit power of an ADSL modem operating in a splitterless environment having multiple telephone sets. The present invention is also applicable to any xDSL technology intended to operate in a splitterless environment, including those xDSL technologies that employ one or more of the following techniques: Discrete Multi-Tone (DMT), Carrierless Amplitude and Phase Modulation (CAP), Echo Cancellation (EC), and Frequency Division Multiplexing (FDM).

Figure 1:
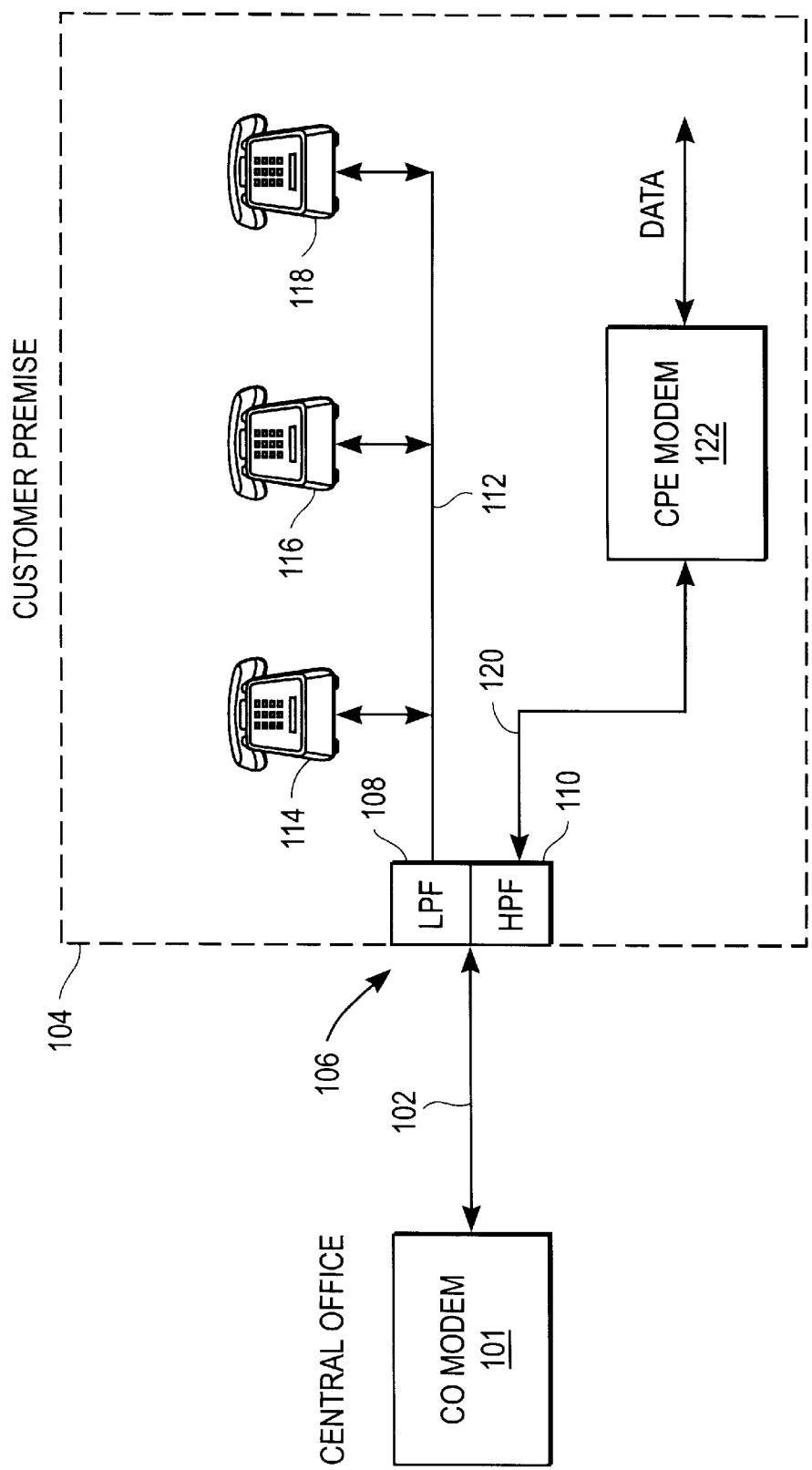
FIG. 1 is a functional block diagram of a conventional ADSL system.

Referring to FIG. 1, there is shown a functional block diagram of a conventional ADSL system 100. The ADSL system 100 includes CO modem 101, subscriber loop 102, splitter 106, customer telephone sets 114, 116, 118, and CPE modem 122.

CO modem 101 is coupled to one end of subscriber loop 102, which typically comprises a twisted-pair of copper telephone lines. The other end of subscriber loop 102 is coupled to splitter 106, which is installed at customer premise 104. Splitter 106 includes low-pass filter (LPF) 108, which has an output coupled to wire-pair 112 for passing POTS signals to customer telephone sets 114, 116,118. Similarly, splitter 106 includes high-pass filter (HPF) 110, which has an output coupled to wire-pair 120 for passing high frequency ADSL signals to CPE modem 122.

The conventional ADSL system 100 described above provides quality POTS signals to the customer premise 104 with subscriber loop 102, splitter 106, and wire-pairs 112, 120. Such a configuration usually requires technical personnel to install the splitter 106 and rewire the customer premise 104. This type of installation may be satisfactory for certain customers, but can impede large scale deployment of ADSL systems to the general public, which typically requires simple and inexpensive deployment.

Figure 2:
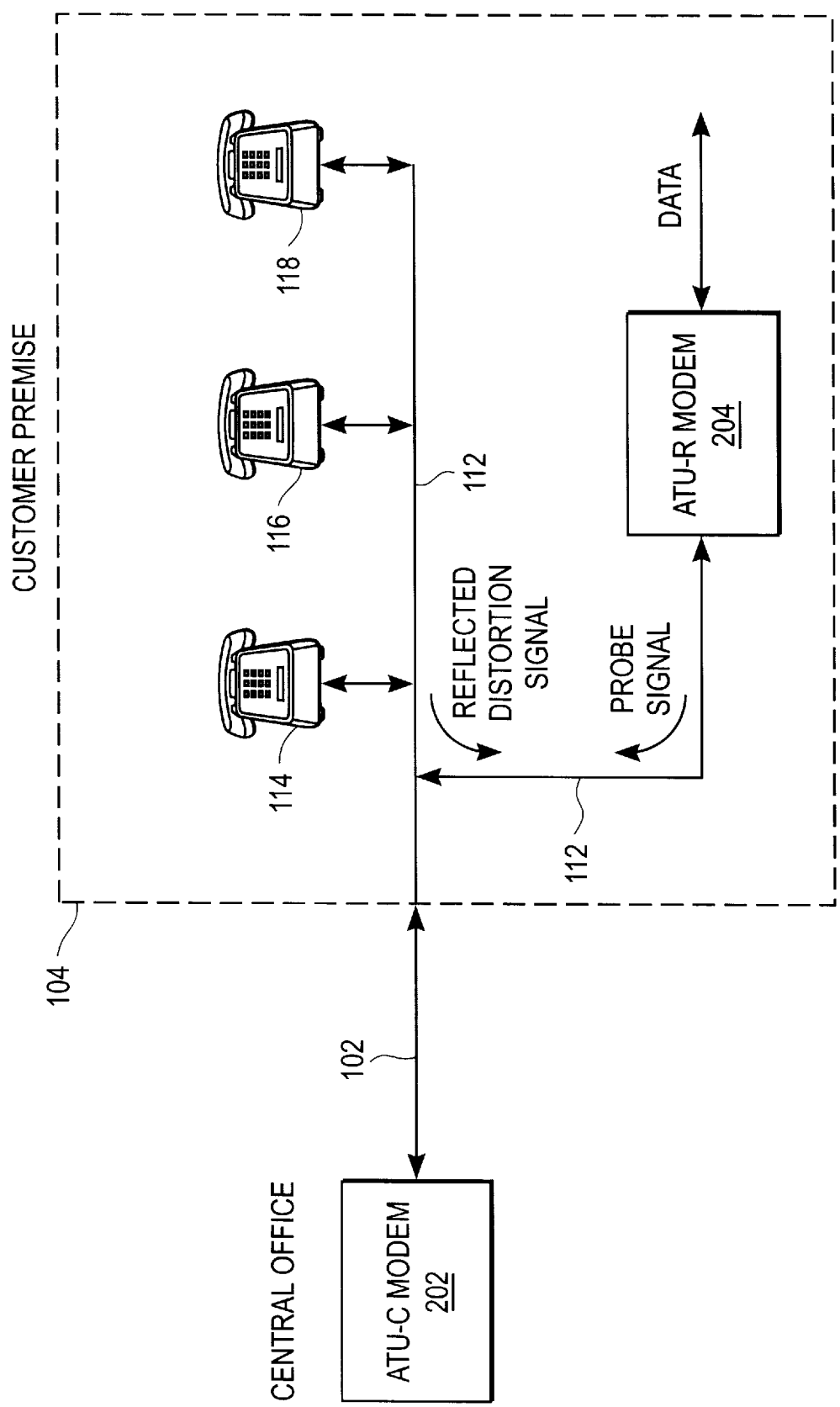
FIG. 2 is a functional block diagram of a preferred embodiment of a splitterless ADSL system in accordance with the present invention.

Referring to FIG. 2, there is shown a functional block diagram of a preferred embodiment of a splitterless ADSL system 200 in accordance with the present invention. The splitterless ADSL system 200 includes splitterless CO modem 202 (hereinafter also referred to as "ATU-C modem 202"), subscriber loop 102, customer telephone sets 114, 116, 118, and splitterless CPE modem 204 (hereinafter also referred to as "ATU-R modem 204").

In splitterless ADSL system 200, splitter 106 is removed and customer telephone sets 114, 116, 118 share wire-pair 112 with ATU-R modem 204. Without splitter 106, the high frequency ADSL signals from ATU-C modem 202 are transmitted directly to customer telephone sets 114, 116, 118. These frequencies are typically too high to be heard by a user directly. Most conventional telephone sets, however, introduce nonlinear distortion which creates new frequency components, some of which are within the POTS frequency band (hereinafter also referred to as the "voiceband"). Unlike high frequency ADSL signals, these low frequency distorted signals can be heard by the user.

For the splitterless system 200 shown in FIG. 2, the level of distortion in the voiceband is dependent on the transmit power generated by ATU-R modem 204. Accordingly, one known method of reducing the nonlinear distortion generated by customer telephone sets 114, 116, 118, is to reduce the transmit power generated by ATU-R modem 204. ITU-T recommendation G.992.2 describes a fast retrain procedure for this purpose.

When ADSL modems 202, 204 are in a data transmission mode and one or more customer telephone sets 114, 116, 118, change hook state (e.g., from on-hook to off-hook, or vice-versa), the fast retrain procedure described in G.992.2 estimates the appropriate transmit power for ATU-R modem 204. However, G.992.2 does not disclose a system or method of finding the proper transmit power for ATU-R modem 204 when operating in an environment having multiple telephone sets with different electrical characteristics. Such a system or method is vendor-discretionary. Thus, the present invention provides a solution to a problem not addressed by current industry standards.

As shown in FIG. 2, one or more telephone sets 114, 116, 118, can be connected to the same wire-pair 112 as ATU-R modem 204. Each telephone set generates a different level of nonlinear distortion when taken off-hook. Thus, the appropriate transmit power for ATU-R modem 204 is dependent on the electrical characteristics of the telephone set being used. The present invention provides a system and method for estimating the appropriate transmit power for ATU-R modem 204 during a fast retrain procedure, as described in detail below.

Figure 3:
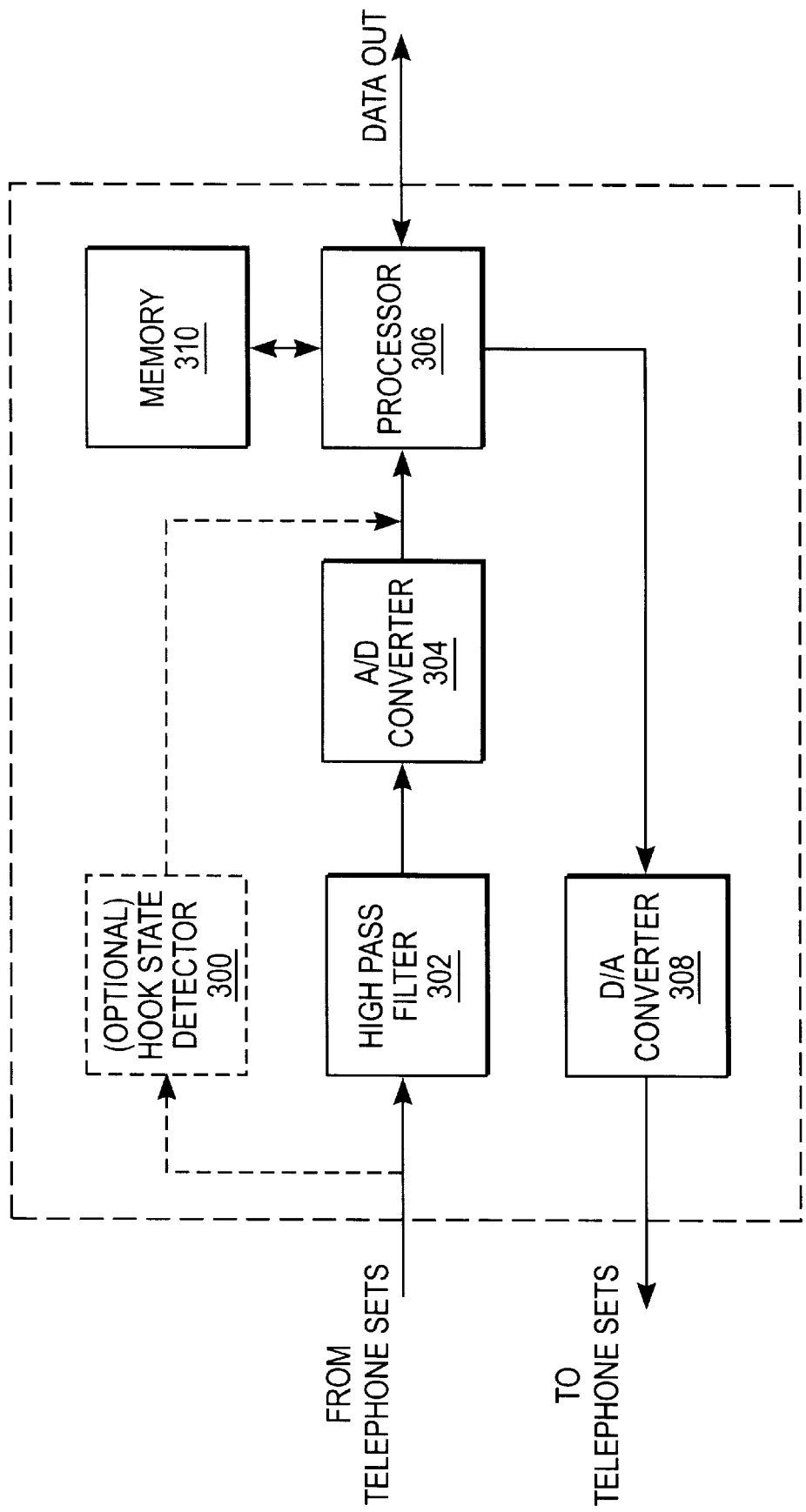
FIG. 3 is a simplified functional block diagram of a preferred embodiment of a splitterless ADSL modem in accordance with the present invention.

Referring to FIG. 3, there is shown a simplified functional block diagram of a preferred embodiment of ATU-R modem 204 in FIG. 2 in accordance with the present invention. ATU-R modem 204 generally includes hook state detector 300 (optional), high pass filter 302, analog-to-digital converter (A/D) 304, processor 306, digital-to-analog converter 308 (D/A), and memory 310. Alternatively, the hook state detector 300 can be removed and hook state changes can be detected directly by processor 306. Moreover, it is noted that other functions typically used in ATU-R modem 204 have been removed from FIG. 3 for clarity.

As shown in FIG. 3, ADSL data signals and signals reflected from telephone sets 114, 116, 118 are received by HPF 302, which passes only those signals above a predetermined frequency (e.g., above 4 KHz). Thus, HPF 302 prevents ATU-R modem 204 from measuring distortion in the POTS band. HPF 302 is coupled to a conventional A/D converter 304, which converts the received signals into digital representations using conventional techniques. The A/D converter 304 is coupled to processor 306, which executes software for processing the signals in accordance with the present invention. Preferably, processor 306 is a dedicated Digital Signal Processor (DSP). Alternatively, processor 306 can be a general purpose processor.

Processor 306 is coupled to D/A converter 308 for converting signals processed and/or generated by processor 306 into an analog representation suitable for conventional telephone lines. Optionally, the hook state detector 300 is coupled to the telephone lines and processor 306 for monitoring and detecting hook state change signals using conventional hardware circuitry.

In accordance with the operation of the present invention, processor 306 in ATU-R modem 204 transmits a probe signal 500 (FIG. 5) to customer telephone sets 114, 116, 118, in response to a hook state change signal on the telephone line. The characteristics and level of the probe signal 500 are described with respect to FIG. 5 below. In a preferred embodiment, the probe signal 500 includes all frequency bins that fall within an upstream frequency band 600, as described with respect to FIG. 6 below. Each of the telephone sets 114, 116, 118, reflects a portion of the distorted probe signal 500 back to ATU-R modem 204, as shown in FIG. 2. The distorted portion of the reflected probe signal 500 falling within the downstream frequency band 602 (FIG. 6) is passed by high pass filter 302, converted to digital representations by A/D converter 304, then measured by processor 306. Processor 306 includes software for computing the average power of the received distortion signal. In the event that more than one telephone set is off-hook, distortions from different telephones are added and the telephone set with the worst distortion will dominate in the average power calculation. Based on the measured distortion levels for different transmit signal levels, the software in processor 306 determines the appropriate transmit power for ATU-R modem 204 by applying a "corner point" detection method, as described in detail below with respect to FIG. 7.

One advantage to using the probe signal 500 as described above, is that ATU-R modem 204 can estimate the proper transmit power for splitterness configurations having multiple telephone sets without prior knowledge of the types (i.e., electrical characteristics) of such telephone sets. This enables vendors to develop standardized ADSL modems that can be used with any splitterless configuration, thus furthering the mass deployment of ADSL technology to the general public.

Figure 4:
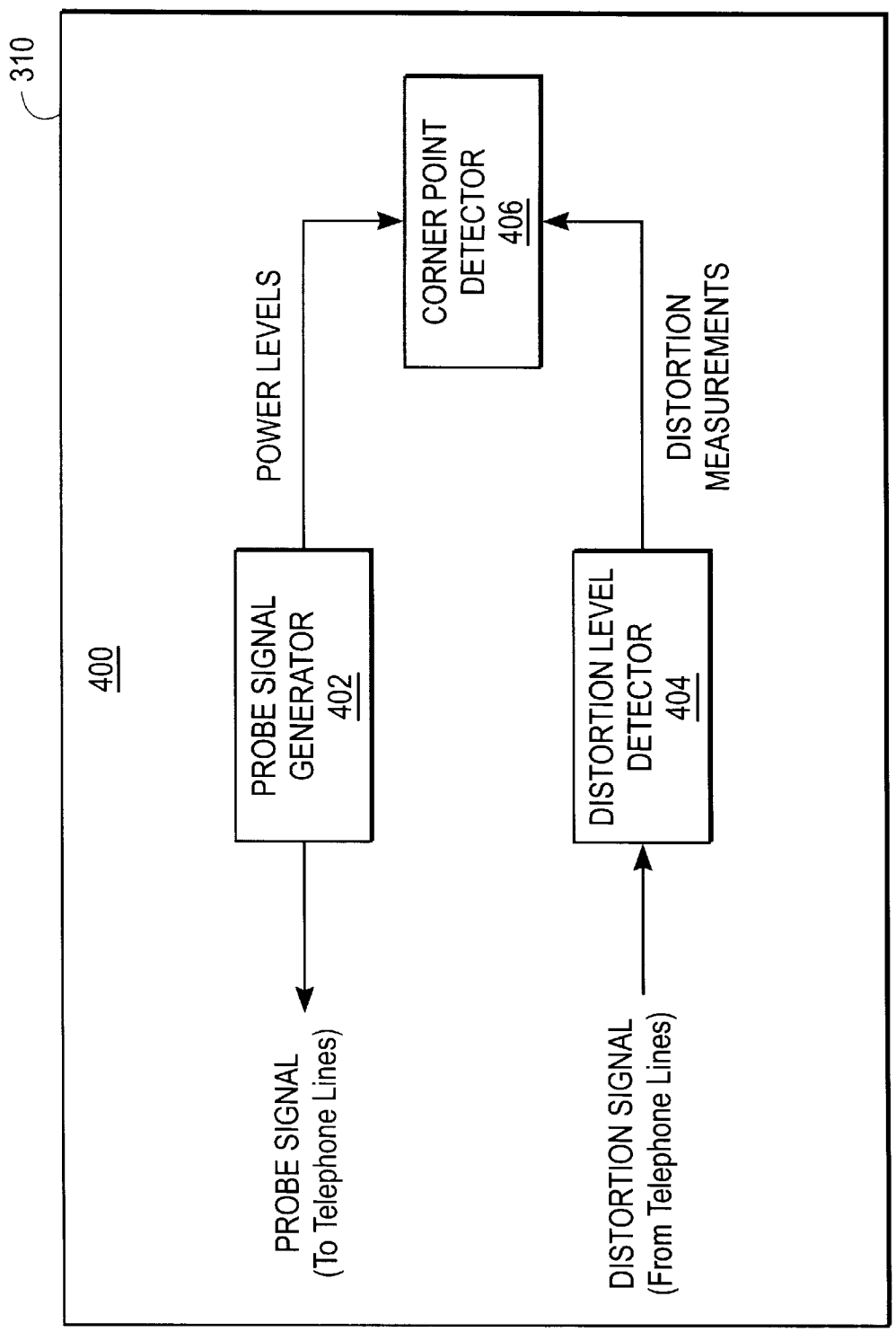
FIG. 4 is a simplified functional block diagram of a system for controlling transmit power in accordance with the present invention.

Referring to FIG. 4, there is shown a simplified functional block diagram of a system 400 for controlling transmit power in accordance with the present invention. In a preferred embodiment, the system 400 is implemented as software instructions in memory 310 coupled to processor 306, which when executed by processor 306, provide functions in accordance with the present invention.

The system 400 includes a probe signal generator 402, a distortion level detector 404, and a corner point detector 406. The probe signal generator 402 is coupled to the telephone lines and provides the probe signal 500 to one or more telephone sets, as described with respect to FIG. 5 below. The distortion level detector 404 is coupled to the telephone lines and detects and measures the level of a distortion signal 700 reflected from the telephone sets in the splitterless environment, as described below with respect to FIG. 7. The corner point detector 406 is coupled to the probe signal generator 402 and the distortion level detector 404 for determining the corner point of the distortion signal 700, as described below with respect to FIG. 7.

In a preferred embodiment, memory 310 also includes other signal processing functions, including, for example, symbol encoding/decoding, filtering, scrambling, equalization, and gain adjustment For clarity, these functions are not shown in FIG. 4.

Figure 5:
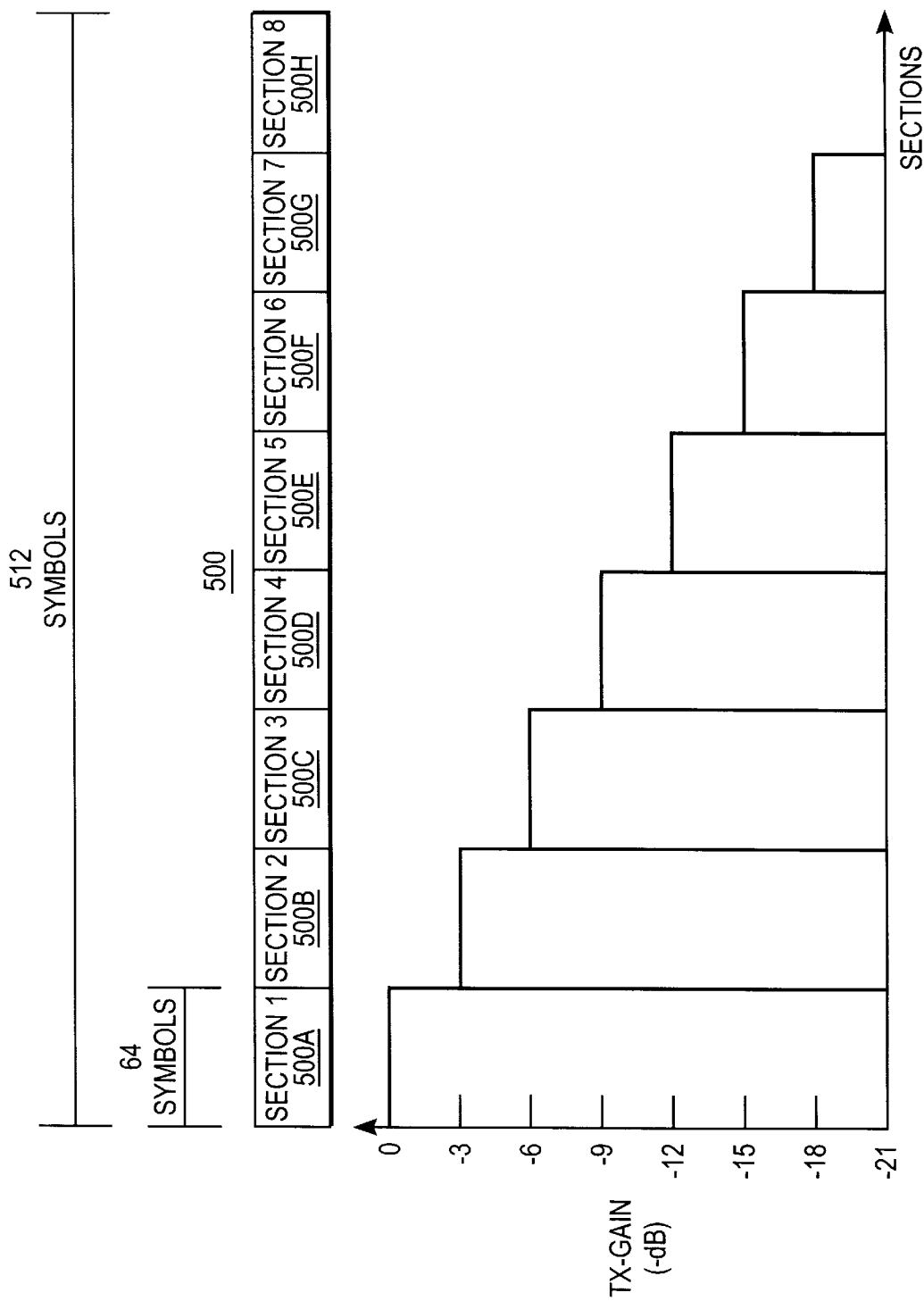
FIG. 5 is an illustration of a preferred embodiment of a probe signal transmitted by the splitterless ADSL modem in FIG. 3 in accordance with the present invention.

Referring to FIG. 5, there is shown an illustration of a preferred embodiment of a probe signal 500 transmitted by ATU-R modem 204 in FIG. 3 in accordance with the present invention. In the preferred embodiment, probe signal 500 comprises five hundred and twelve symbols (e.g., DMT symbols). A "symbol" is the basic unit of information transmitted by an ADSL modem. These five hundred and twelve symbols are divided into eight sections 500A–500H, with each section having sixty-four symbols. As shown in FIG. 5, the transmit power levels of the eight sections of probe signal 500 have transmit gains (TX-GAIN) equal to 0 dB, −3 dB, −6 dB, −9 dB, −12 dB, −15 dB, −18 dB, and −21 dB, respectively. Each transmit gain is relative to a nominal power level $P_{wo}$.

In a preferred embodiment, a fast retrain procedure begins when a user removes the handset of one of the customer telephone sets 114, 116, 118, off its hook, or alternatively, ATU-R modem 204 detects a fast retrain request signal from ATU-C modem 200. Processor 306 then begins to transmit the sixty-four symbols in section 500A of the probe signal 500 at full power (0 dB reduction, i.e., nominal power). The probe signal 500 is distorted and reflected back to ATU-R modem 204 from customer telephone sets 114, 116, 118, as shown in FIG. 2. The average power of the reflected distortion signal within the downstream frequency band (see, e.g., the second region 610 in FIG. 6) is measured by processor 306. After measuring the average power, the next sixty-four symbols in section 500B are transmitted serially to customer telephone sets 114, 116, 118, at a reduced transmit power (e.g., −3 dB below nominal). This procedure repeats itself by sending consecutive sections of symbols (sections 500C–500H) having incrementally reduced transmit powers until the distortion levels for all different transmit levels are measured and the proper transmit power is determined, as described below with respect to FIG. 7. In a preferred embodiment, the transmit power is incrementally reduced by −3 dB for each section (500A–500H) of probe signal 500. Alternatively, a different step size (e.g., −4 dB or −5 dB) may be used to reduce the transmit power. The step size can be adjusted based on the slope of the distortion curve, as described in FIG. 7. If the slope is large (i.e., above a predetermined value), a larger step size can provide a coarse adjustment to the transmit power level. This course adjustment can reduce the time needed for determining the optimum transmit power level. As the slope becomes less steep, a smaller step size can provide a fine adjustment to the transmit power level to enable detection of the corner point, as described in FIG. 7.

Figure 6:
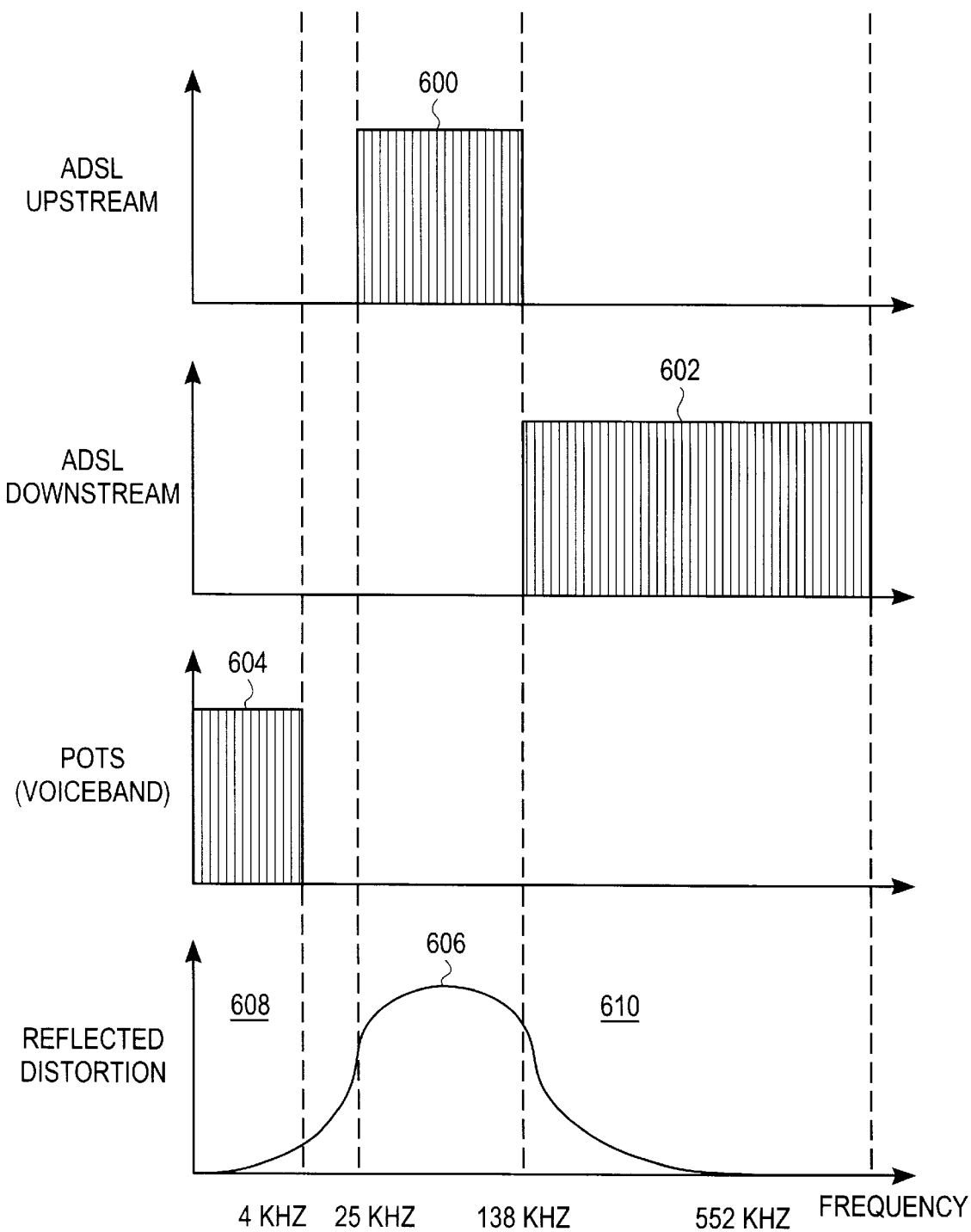
FIG. 6 are frequency plots for the splitterless ADSL modem in FIG. 3 illustrating the frequency band of nonlinear distortion received by the ADSL modem in accordance with the present invention.

Referring to FIG. 6, there is shown frequency plots for ATU-R modem 204 in FIG. 3 illustrating the frequency band of nonlinear distortion 606 received by ATU-R modem 204 in accordance with the present invention. The top of FIG. 6 shows an ADSL upstream frequency band 600 for ATU-R modem 204. ATU-R modem 204 sends ADSL signals to ATU-C modem 202 in upstream frequency band 600, which can range from about 25 kHz to about 138 kHz. ATU-R modem 204 receives ADSL signals from ATU-C modem 202 in downstream frequency band 602, which can range from about 138 kHz to about 552 kHz. Voiceband communication takes place within POTS frequency band 604, which can range from about 0 Hz to about 4 kHz.

At the bottom of FIG. 6, there is shown a plot of nonlinear distortion 606 generated by customer telephone sets 114, 116, 118, in response to receiving high frequency ADSL signals from ATU-R modem 204. The nonlinear distortion 606 is typically caused by impedance mismatch and spans a range wider than that of the upstream frequencies (e.g., 25 KHz–138 KHz). A first region 608 in the POTS frequency band 604 includes a portion of nonlinear distortion 606. A second region 610 in the downstream frequency band 602 includes a portion of nonlinear distortion 606.

It is desirable to estimate and reduce the portion of nonlinear distortion 606 in the first region 608. It is difficult, however, for ATU-R modem 204 to measure the nonlinear distortion 606 in the first region 608 directly because the high pass filter 302 prevents the nonlinear distortion 606 from reaching processor 306, where its average power can be measured. On the other hand, the portion of nonlinear distortion 606 in the second region 610 can be measured by ATU-R modem 204. Therefore, it is an object of the present invention to have ATU-R modem 204 measure the portion of nonlinear distortion 606 in the second region 610, then use the measurement to indirectly estimate the nonlinear distortion 606 in the first region 608.

The inventors of the present invention have observed that the ratio of absolute distortion levels in first and second regions 608, 610, is dependent on the electrical characteristics of the telephone sets being used. Thus, one cannot simply set a threshold for the distortion in the second region 610 to guarantee the distortion level in the first region 608, without prior knowledge of the types of telephone sets being used.

Figure 7:
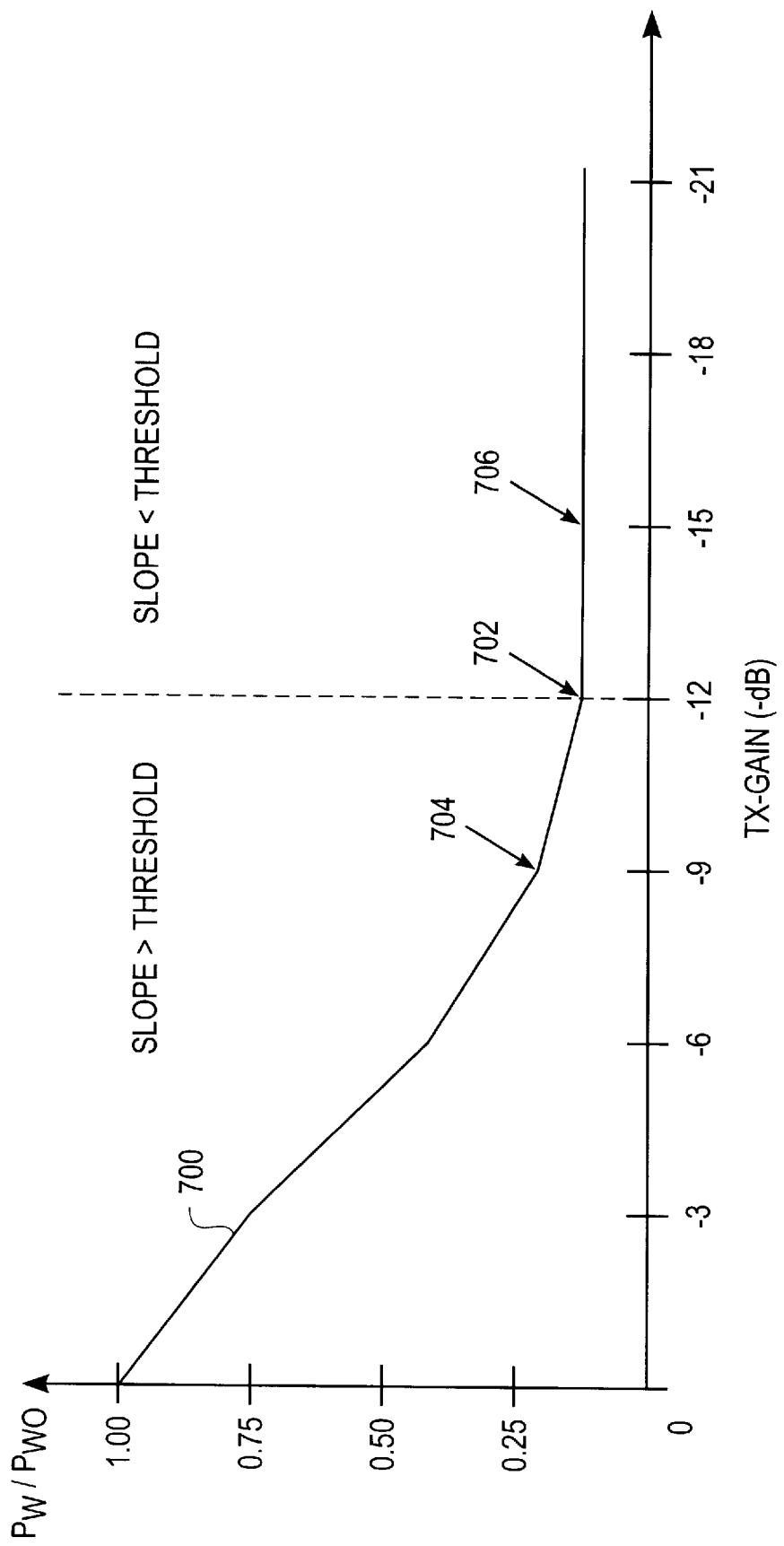
FIG. 7 is a plot of an exemplary distortion signal illustrating a preferred embodiment of "corner point" detection in accordance with the present invention.

Referring to FIG. 7, there is shown a plot of an exemplary distortion signal 700 illustrating one embodiment of "corner point" detection in accordance with the present invention. The vertical axis of the plot represents the distortion signal 700 level relative to the nominal power level $P_{wo}$, i.e., the power level of the distortion signal 700 when the transmit gain is nominal. The horizontal axis represents the transmit gain of the probe signal 500, as described with respect to FIG. 5. Thus, the distortion signal 700 is a function of the transmit gain of the probe signal 500.

As shown in FIG. 7, the distortion signal 700 decreases monotonically; quickly at first, then eventually flattening out as the transmit power of the probe signal 500 is reduced. The point where the distortion signal 700 begins to flatten out is the corner point 702, which is delimited by measurements 702, 704, and 706. In FIG. 7, the slope between measurements 702 and 706 is much smaller than the slope between measurements 704 and 702, and is below a predetermined threshold. Therefore, the measurement 702 is determined to be the corner point of the distortion signal 700 reflected from the telephone sets. As described below, the corner point 702 is used by the present invention to determine the proper transmit power for ATU-R modem 204 without prior knowledge of the type or electrical characteristics of the particular telephone sets being used.

In a preferred embodiment, a fast retrain procedure is initiated by ATU-R modem 204 in response to ATU-R modem 204 detecting hook state changes of one or more customer telephone sets 14, 116, 118, or alternatively, in response to a request signal from ATU-C modem 202. In response to a hook state change signal or request signal, the first section 500A (0 dB) of the probe signal 500 is transmitted to one or more customer telephone sets at full or normal power. The distortion signal 700 is reflected from the telephone sets to ATU-R modem 204, where its power level is measured by processor 306. Next, the second section 500B (−3 dB) of the probe signal 500 is transmitted to one or more customer telephone sets 114, 116, 118. Again, the distortion signal 700 is reflected from the telephone sets to ATU-R modem 204, where its power level is measured by processor 306. ATU-R modem 204 repeats the above process for sections 500C through 500H of probe signal 500.

After taking eight measurements as described above, processor 306 finds the corner point 702 of the distortion signal 700 reflected from the telephone sets. This is done by, for example, computing the slope of the line segment joining two consecutive measurements, then comparing the result against a predetermined threshold, as described with respect to FIG. 7. Preferably, the threshold value is selected to be some arbitrarily small number indicative of the flattening of the distortion signal 700. If the slope is determined by processor 306 to be less than the predetermined threshold, the transmit level of the probe signal 500 at the corner point 702 is saved in memory 310 and used later by ATU-R modem 204.

In the present example, corner point 702 is determined during the transmission of section 500E of the probe signal 500. The gain associated with the corner point 702 (e.g., −12 dB) is saved in memory 310 and the future transmit power of ATU-R modem 204 is 12 dB below the nominal level.

Figure 8:
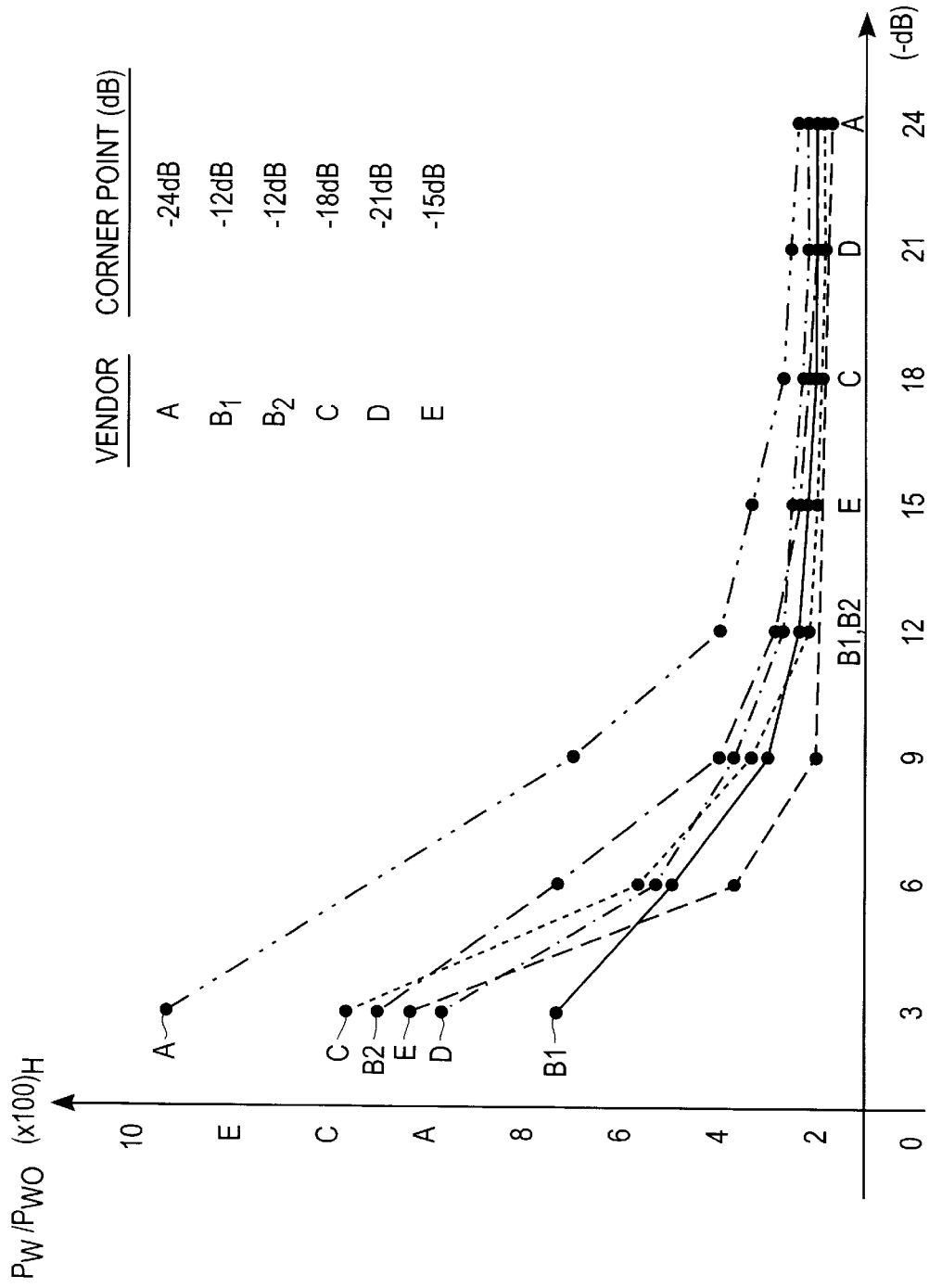
FIG. 8 is a plot of distortion signals generated by exemplary telephone sets in accordance with the present invention.

Referring to FIG. 8, there is shown a plot of distortion signals for various exemplary telephone sets in accordance with the present invention. These plots are the actual results of an empirical study on six different telephones sets manufactured by five different vendors, hereinafter referred to as vendors A–E. The vertical axis of the plot represents the distorted signal level in hexadecimal notation. The horizontal axis represents the transmit level reduction from nominal level to generate the distorted signal level, as described with respect to FIG. 5.

It can be observed from FIG. 8, that each telephone set has different distortion signal characteristics. For example, the distortion signal level generated by the vendor A telephone set decreases at a much slower rate than the distortion signal level generated by the vender E telephone set. The rate of decrease determines the location of the corner point on each distortion signal for any given telephone set. Thus, the plot in FIG. 8 demonstrates that each telephone has a different corner point, and therefore a different proper transmit power. If each telephone has a different proper transmit power, it is evident that a single predetermined transmit power may not be adequate for a splitterless environment having multiple telephone sets.

As described with respect to FIG. 6, the nonlinear distortion 606 is measured in the downstream frequency band 602. It is desired, however, that the level of nonlinear distortion 606 not affect services in POTS frequency band 604. The corner point 702 (FIG. 7) indicates that the nonlinear distortion 606 reflected by the telephone set is nearly eliminated. Therefore, the measurement in the downstream frequency band 602 can ensure the nonlinear distortion 606 in the POTS band 604 is nearly eliminated.

In splitterless environments having multiple telephone sets made by different manufacturers, it is difficult to select one predetermined transmit power level that will minimize distortion in all telephone sets, yet still have sufficient SNR for ADSL data communication with the CO. The present invention overcomes this problem by using the specially designed probe signal 500 to estimate the proper transmit power level for ADSL communication, as described with respect to FIGS. 5–7.

Figure 9:
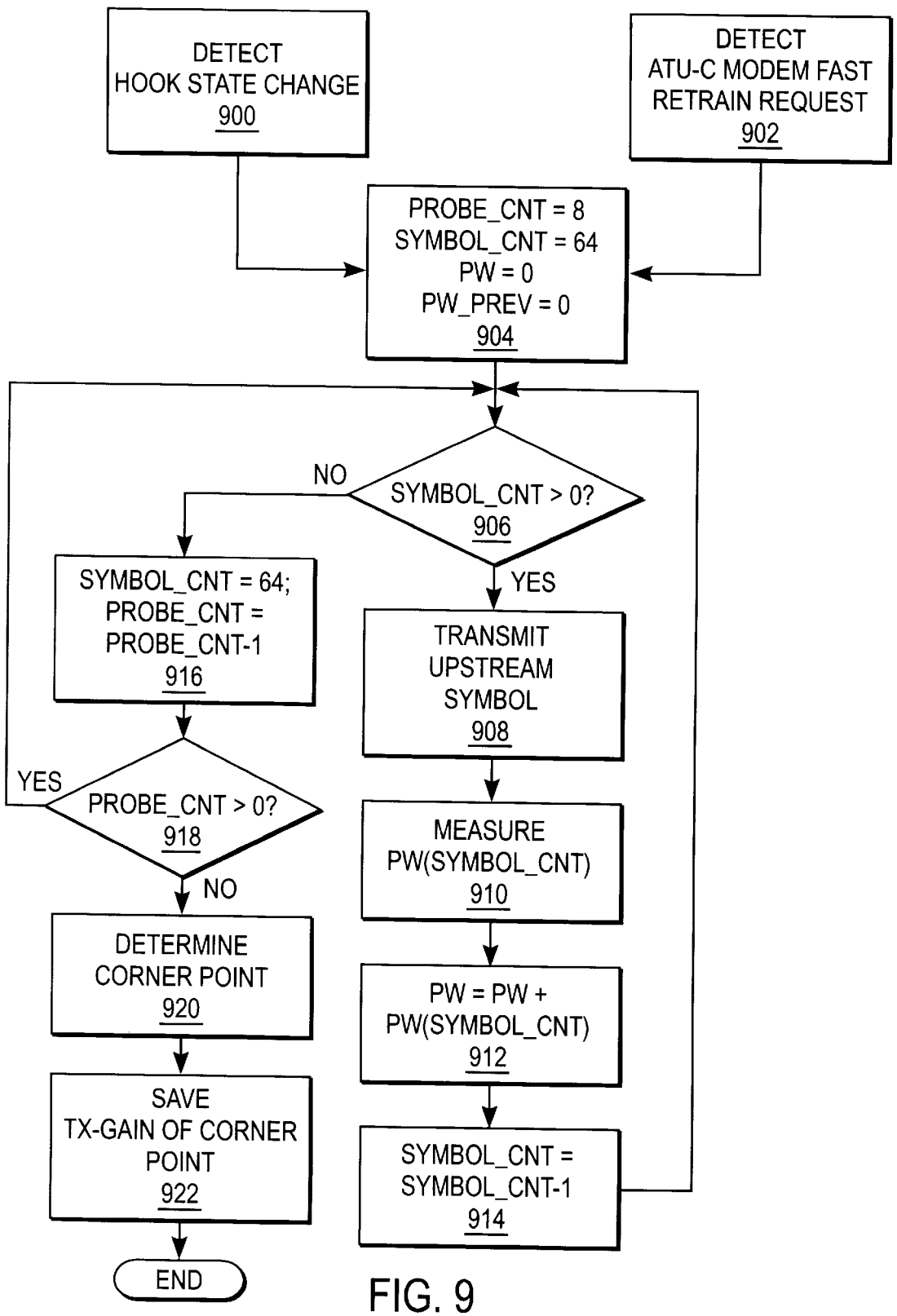
FIG. 9 is a flow diagram of a preferred embodiment of a fast retrain method for use by the splitterless ADSL modem in FIG. 3 in accordance with the present invention.

Referring to FIG. 9, there is shown a flow diagram of a preferred embodiment of a fast retrain method for use by ATU-R modem 204 in accordance with the present invention. If a hook state change from a telephone set is detected 900, or a fast retrain request is detected 902, various counters and parameters used in the procedure are initialized 904. For example, a variable PROBE_CNT is set equal to the total number of sections of a probe signal (e.g., 8). Similarly, a variable SYMBOL_CNT is set equal to the total number of symbols in each section of the probe signal (e.g., 64). Additionally, a current power variable PW and a previous power variable PW_PREV are set to zero.

While 906 SYMBOL_CNT is greater than zero, ATU-R modem 204 serially transmits 908 symbols in one section of symbols. In a preferred embodiment, there are sixty-four symbols in each section of the probe signal 500 (FIG. 5). Each symbol is transmitted with a predetermined transmit gain associated with that section. All symbols within a particular section are transmitted with the same transmit gain. Alternatively, subsets of symbols in a section can have different transmit gains. Also, the number of sections and symbols per section can be adjusted to suit the particular application. However, the number of symbols transmitted with any particular transmit gain should be sufficient in number to capture a useful measurement of the reflected distortion signal.

For each transmitted symbol in a particular section, the power level of the reflected distortion signal 700 from the telephone set is measured 910 and added 912 to the previous measurement made by processor 306. After each measurement is added 912 to the previous measurement, the symbol counter SYMBOL_CNT is decreased 914 by one. Thus, each symbol in a section of symbols is transmitted to the telephone set until the SYMBOL_CNT equals zero, thereby exhausting the supply of symbols for that particular section.

If the SYMBOL_CNT equals zero, the SYMBOL_CNT is reset 916 and the PROBE_CNT is decreased 916 by one. If the PROBE_CNT is greater than zero 918, the next section of symbols is processed as described above. Otherwise, processor 306 determines 920 the corner point 702 (FIG. 7) and saves 922 the transmit gain of the probe signal 500 at the corner point 702 before terminating the fast retrain procedure. The saved transmit gain is used to adjust the transmit power level for ATU-R modem 204, thereby eliminating nonlinear distortion in the voiceband 602 (FIG. 6).

Although the present invention has been described in considerable detail with reference to certain preferred embodiments thereof, other embodiments are possible. For example, the probe signal can be transmitted to telephones sets at a variety of transmit power levels and step sizes, which can be adjusted on the fly. Moreover, the transmit power level of the probe signal can be either reduced or increased from a nominal transmit power level depending on the application. Other embodiments may employ different probe signal formats, including formats having a variable number of sections and/or symbols per section. Thus, the scope of the present invention, as defined by the appended claims, should not be limited to the description of the preferred embodiments herein.

What is claimed is:

1. A method of reducing distortion in the voiceband of a splitterless Digital Subscriber Line (DSL), comprising the steps of:

transmitting a probe signal to at least one telephone set, the probe signal having a plurality of sections, each section including a plurality of symbols, wherein each section of symbols is transmitted at a predetermined power level;

receiving a distortion signal reflected from the telephone set due to each section of the probe signal;

detecting a corner point based on the measurement of the received distortion signal from the plurality of sections of the probe signal;

wherein the corner point is detected by performing the steps of:

computing a ratio having a numerator equal to the difference between each two adjacent measurements and a denominator equal to the difference between these two adjacent power levels; and finding a sharp change in the ratio value.

2. The method of claim 1, further including the step of saving the power level associated with the detected corner point.

3. The method of claim 1, wherein the measuring steps further include measuring the distortion signal in a frequency band different from the voiceband.

4. The method of claim 1, wherein the adjusting step includes adjusting one power level to the next power level by a predetermined amount of power.

5. The method of claim 1, wherein the adjusting step further includes adjusting one power level to the next power level by an amount of power determined by the ratio value.

6. The method of claim 1, wherein the measuring steps further include measuring the average power of the distortion signal.

7. The method of claim 1, wherein the transmitting step is initiated in response to a fast retrain request signal.

8. The method of claim 1, wherein the transmitting step is initiated in response to detecting a hook state change.

9. A computer-readable medium having stored thereon instructions which, when executed by a processor, cause the processor to perform the steps of:

transmitting a probe signal to at least one telephone set, the probe signal having a plurality of sections, each section including a plurality of symbols, wherein each section of symbols is transmitted at a predetermined power level;

receiving a distortion signal reflected from the telephone set due to each section of the probe signal; and detecting a corner point based on the measurement of the received distortion signal from the plurality of sections of the probe signal, wherein the corner point is detected by performing the steps of:

computing a ratio having a numerator equal to the difference between two adjacent measurements and a denominator equal to the difference between these two adjacent power levels; and finding a sharp change in the ratio values.

10. The computer-readable medium of claim 9, further including the step of saving the power level associated with the detected corner point.

11. The computer-readable medium of claim 9, wherein the measuring steps further include measuring the distortion signal in a frequency band different from the voiceband.

12. The computer-readable medium of claim 9, wherein the adjusting step includes adjusting one power level to the next power level by a predetermined amount of power.

13. The computer-readable medium of claim 9, wherein the adjusting step further includes adjusting one power level to the next power level by an amount of power determined by the ratio value.

14. The computer-readable medium of claim 9, wherein the measuring steps further include measuring the average power of the distortion signal.

15. The computer-readable medium of claim 9, wherein the transmitting step is initiated in response to a fast retrain request signal.

16. The computer-readable medium of claim 9, wherein the transmitting step is initiated in response to detecting a hook state change.

17. A system for reducing distortion in the voiceband of a splitterless Digital Subscriber Line (DSL), comprising:
- a probe signal generator coupled to a telephone line for transmitting a probe signal to at least one telephone set the probe signal having a plurality of sections, each section including a plurality of symbols that are transmitted at a predetermined power level;
- a distortion level detector coupled to the telephone line for receiving and measuring a distortion signal reflected from the telephone set due to each section of the probe signal; and
- a corner point detector coupled to the probe signal generator and the distortion level detector for detecting a corner point in the received distortion signal based on the measurements of the received distortion signal from the plurality of sections of the probe signal, wherein the corner point detector performs the steps of:
- computing a ratio having a numerator equal to the difference between each two adjacent measurements and a denominator equal to the difference between these two adjacent power levels; and
- finding a sharp change in the ratio value.

18. The system of claim 17, wherein the corner point detector saves one of the plurality of power levels if the corner point is detected.

19. The system of claim 17, wherein the distortion level detector measures the average power of the distortion signal.

20. The system of claim 17, wherein the probe signal is generated in response to a fast retrain request signal.

21. The system of claim 17, wherein the probe signal is generated in response to detecting a hook state change.

22. The system of claim 17, wherein the probe signal generator adjusts the power level of the probe signal from one power level to the next power level by a predetermined amount of power.

23. The system of claim 17, wherein the probe signal generator adjusts the power level of the probe signal from one power level to the next power level by an amount of power determined by the ratio value.

24. The system of claim 13, wherein the system further includes a filter that prevents the distortion level detector from measuring the distortion signal in the voiceband.

* * * * *

UNITED STATES PATENT AND TRADEMARK OFFICE
CERTIFICATE OF CORRECTION

PATENT NO. : 6,236,714 B1
DATED : May 22, 2001
INVENTOR(S) : Qingyi Zheng et al.

It is certified that error appears in the above-identified patent and that said Letters Patent is hereby corrected as shown below:

In the ABSTRACT,
Correct the second word on the second line from [transnit] to -- transmit] --.

Claim 1,
Line 14, after the word "signal;" insert -- and --.

Signed and Sealed this

Eleventh Day of December, 2001

Attest:

*Nicholas P. Godici*

NICHOLAS P. GODICI
*Attesting Officer*   *Acting Director of the United States Patent and Trademark Office*